(12) United States Patent
Min et al.

(10) Patent No.: US 10,880,480 B2
(45) Date of Patent: Dec. 29, 2020

(54) CAMERA MODULE, ACTUATOR, AND PORTABLE ELECTRONIC DEVICE

(71) Applicant: Samsung Electro-Mechanics Co., Ltd., Suwon-si (KR)

(72) Inventors: Sang Hyun Min, Suwon-si (KR); Kwang Mook Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 63 days.

(21) Appl. No.: 16/508,362

(22) Filed: Jul. 11, 2019

(65) Prior Publication Data

US 2020/0296287 A1 Sep. 17, 2020

(30) Foreign Application Priority Data

Mar. 15, 2019 (KR) .................. 10-2019-0030068

(51) Int. Cl.
| | | |
|---|---|---|
| *H04N 5/232* | (2006.01) | |
| *G01D 5/20* | (2006.01) | |
| *G02B 7/09* | (2006.01) | |
| *G03B 13/36* | (2006.01) | |
| *G03B 5/00* | (2006.01) | |
| *H04N 5/225* | (2006.01) | |
| *G02B 27/64* | (2006.01) | |

(52) U.S. Cl.
CPC ....... *H04N 5/23258* (2013.01); *G01D 5/2006* (2013.01); *G02B 7/09* (2013.01); *G02B 27/646* (2013.01); *G03B 5/00* (2013.01); *G03B 13/36* (2013.01); *H04N 5/2254* (2013.01); *G03B 2205/0007* (2013.01)

(58) Field of Classification Search
CPC .................................................... G01D 5/2006
See application file for complete search history.

(56) References Cited

U.S. PATENT DOCUMENTS

| | | | | |
|---|---|---|---|---|
| 10,594,910 | B2* | 3/2020 | Lee | H04N 5/23267 |
| 10,718,992 | B2* | 7/2020 | Pang | H02K 41/0356 |
| 2018/0284568 | A1* | 10/2018 | Oh | G03B 5/00 |
| 2019/0162562 | A1* | 5/2019 | Min | G02B 27/64 |
| 2019/0289214 | A1* | 9/2019 | Lee | G01D 5/245 |
| 2019/0294027 | A1* | 9/2019 | Kim | G02B 7/09 |
| 2020/0052621 | A1* | 2/2020 | Yu | G03B 13/36 |
| 2020/0166725 | A1* | 5/2020 | Park | H04N 5/22525 |
| 2020/0272027 | A1* | 8/2020 | Kim | G02B 7/08 |

FOREIGN PATENT DOCUMENTS

| | | |
|---|---|---|
| JP | 4390347 B2 | 12/2009 |
| KR | 10-2013-0077216 A | 7/2013 |
| KR | 10-2018-0112689 A | 10/2018 |

* cited by examiner

*Primary Examiner* — Cynthia Segura
(74) *Attorney, Agent, or Firm* — NSIP Law

(57) ABSTRACT

An actuator of a camera module includes a detected portion disposed on a lens barrel, and a position detector including a first sensing coil and a second sensing coil, disposed to face the detected portion, and a reference coil disposed outside of a region facing the detected portion, wherein the position detector detects a position of the detected portion in accordance with calculation results of inductances of the first sensing coil and the second sensing coil, and removes noise components by applying inductance of the reference coil to the calculation results of inductances of the first sensing coil and the second sensing coil.

20 Claims, 10 Drawing Sheets

CAMERA MODULE, ACTUATOR, AND PORTABLE ELECTRONIC DEVICE

CROSS-REFERENCE TO RELATED APPLICATIONS

This application claims the benefit under 35 U.S.C. 119(a) of Korean Patent Application No. 10-2019-0030068 filed on Mar. 15, 2019, in the Korean Intellectual Property Office, the entire disclosure of which is incorporated herein by reference for all purposes.

BACKGROUND

1. Field

The present disclosure relates to a camera module and an actuator thereof.

2. Description of the Background

In general, portable communications terminals, such as mobile phones, PDAs, portable PCs, and the like, have recently become popular for the transmission of image data as well as text or voice data. In response to such a trend, a camera module has been basically provided in portable communications terminals to allow image data transmissions, video chatting, and the like to be performed.

Generally, a camera module may include a lens barrel having a lens therein and a housing accommodating the lens barrel therein, and may include an image sensor, converting an image of a subject into an electric signal. The camera module may employ a short-focus camera module that images subjects at a fixed focus. Recently, a camera module including an actuator capable of autofocusing (AF) adjustment has been adopted, according to technological developments. In addition, such a camera module may employ an actuator for optical image stabilization (OIS) in order to reduce resolution degradation caused by hand-shake.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an actuator of a camera module includes a detected portion disposed on a lens barrel, and a position detector including a first sensing coil and a second sensing coil, disposed to face the detected portion, and a reference coil disposed outside of a region facing the detected portion, wherein the position detector detects a position of the detected portion in accordance with calculation results of inductances of the first sensing coil and the second sensing coil, and removes noise components by applying inductance of the reference coil to the calculation results of inductances of the first sensing coil and the second sensing coil.

The first sensing coil and the second sensing coil may be formed on a multilayer substrate, and the reference coil may be formed on a monolayer substrate.

The reference coil may be formed on one surface or both surfaces of the monolayer substrate.

Inductances of the first sensing coil and the second sensing coil may be greater than inductance of the reference coil.

The inductances of the first sensing coil and the second sensing coil may increase or decrease in different directions in accordance with movement of the detected portion.

The reference coil may include two or more reference coils disposed outside of the region facing the detected portion.

The position detector may detect displacement of the detected portion in a direction perpendicular to a surface on which the first sensing coil and the second sensing coil are arranged.

Inductances of the first sensing coil and the second sensing coil may increase or decrease in the same direction in accordance with movement of the detected portion.

The position detector may detect displacement of the detected portion in an arrangement direction of the first sensing coil and the second sensing coil.

A portable electronic device may include a camera module including the actuator further including an image sensor configured to convert light incident through the lens barrel to an electric signal, and a display unit disposed on a surface of the portable electronic device to display an image based on the electric signal.

In another general aspect, a camera module includes a lens barrel, a housing accommodating the lens barrel and having a hexahedral shape including open upper and lower portions, a detected portion disposed on one side of the lens barrel, and a position detector including a first oscillation circuit including a first sensing coil disposed opposite to the detected portion, a second oscillation circuit including a second sensing coil disposed opposite to the detected portion, and a third oscillation circuit including a reference coil disposed in a corner region of the housing, wherein inductance of the reference coil is maintained within a predetermined range with respect to movement of the lens barrel.

The reference coil may be disposed outside of a region facing the detected portion.

The reference coil may be two or more reference coils disposed in different corner regions of the housing.

The position detector may differentiate frequency of a third oscillation signal output from the third oscillation circuit from calculation results of frequency of a first oscillation signal output from the first oscillation circuit and frequency of a second oscillation signal output from the second oscillation circuit.

The camera module may be a portable electronic device, further including an image sensor configured to convert light incident through the lens barrel to an electric signal, and a display unit disposed on a surface of the portable electronic device to display an image based on the electric signal.

In another general aspect, a portable electronic device includes a lens barrel configured to refract light on an image sensor to generate an electric signal, a display unit configured to display an image in response to the electric signal, a first sensing coil and a second sensing coil, disposed to face a detected portion disposed on the lens barrel, and a reference coil disposed outside of a region facing the detected portion, and a position detector configured to determine a position of the detected portion in accordance with calculation results of inductances of the first sensing coil and the second sensing coil, wherein noise components are removed from the calculation results by applying inductance of the reference coil to inductances of the first sensing coil and the second sensing coil.

The portable electronic device may further include a housing accommodating the lens barrel, wherein the position detector may further include a first oscillation circuit including the first sensing coil, a second oscillation circuit including the second sensing coil, and a third oscillation circuit including the reference coil disposed in a corner region of the housing, and wherein the calculation results of inductances may include frequency of a third oscillation signal output from the third oscillation circuit differentiated from calculation results of frequency of a first oscillation signal output from the first oscillation circuit and frequency of a second oscillation signal output from the second oscillation circuit.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
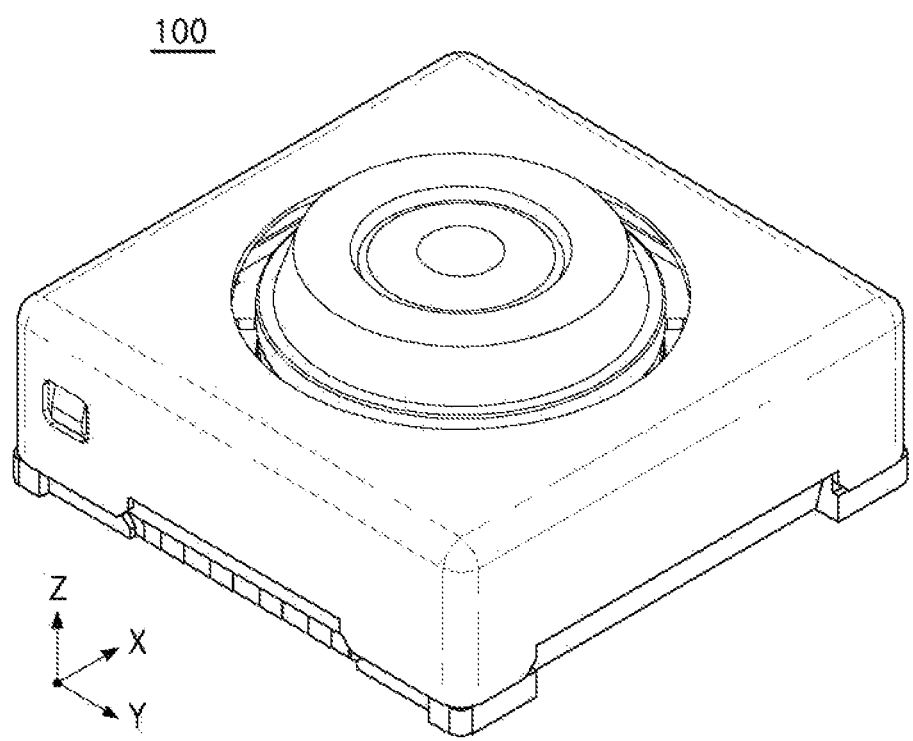
FIG. 1 is a perspective view of a camera module according to one or more examples.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

Aspects of the present disclosure provide a camera module, an actuator, and a portable electronic device capable of precisely detecting a position of a detected portion without employing a hall sensor.

In the examples described herein, the portable electronic device may refer to a mobile communications terminal, a smartphone, a tablet PC or the like.

Figure 2:
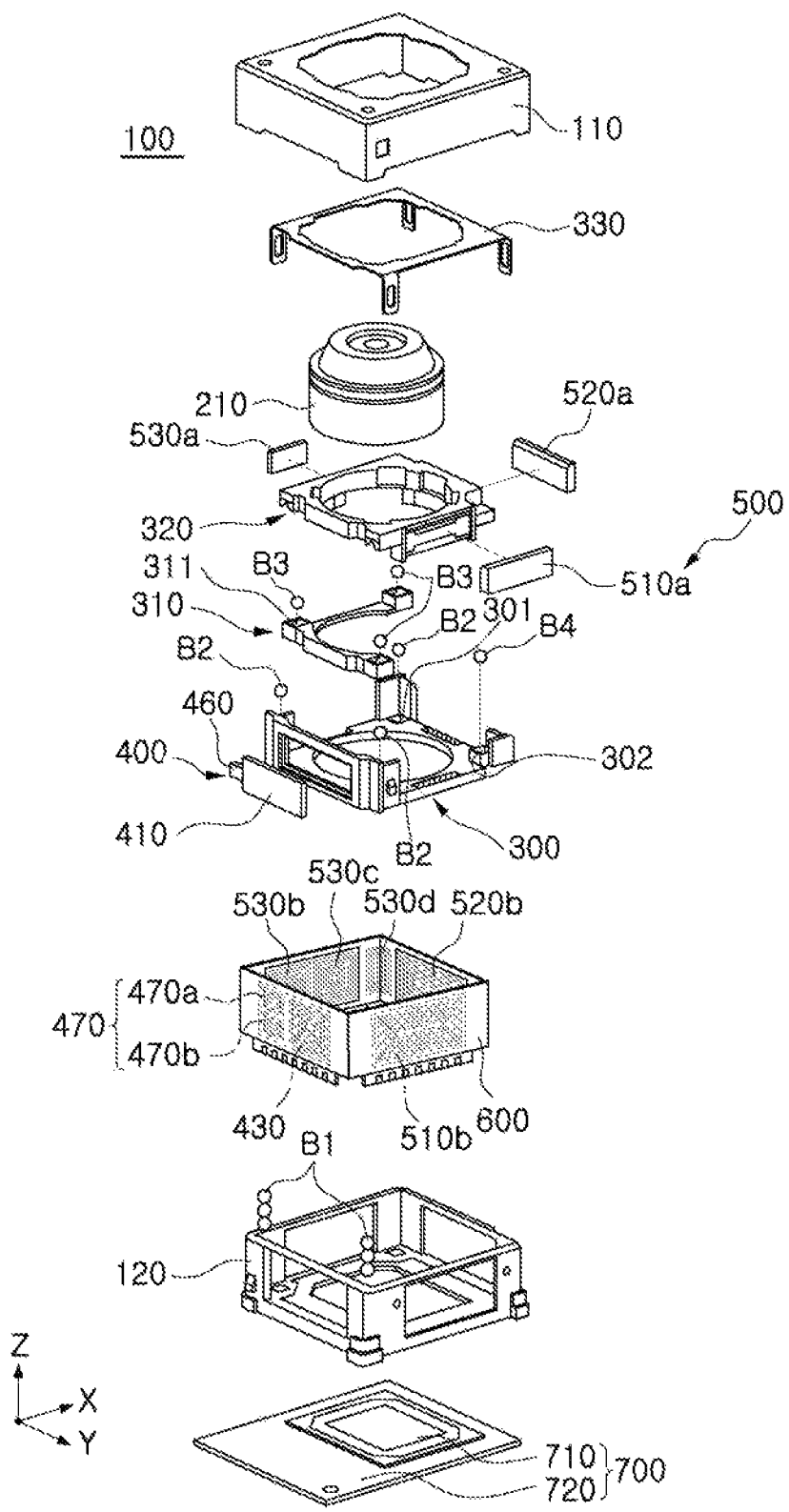
FIG. 2 is a schematic exploded perspective view of a camera module according to one or more examples.
Figure 3A:
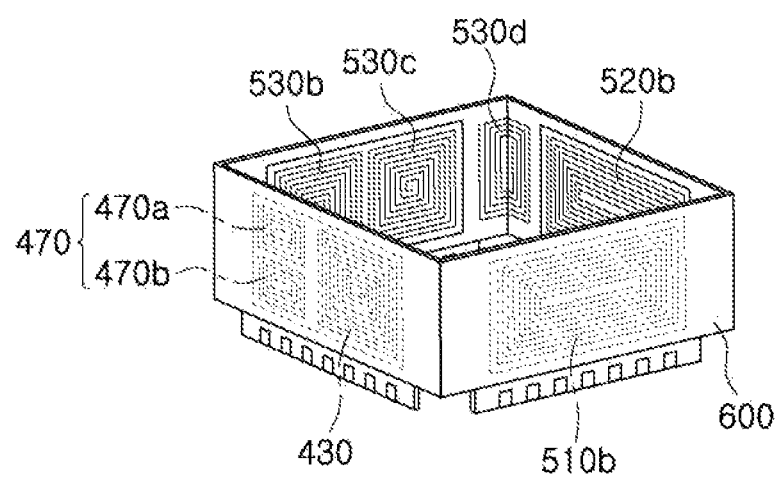
FIG. 3A is an enlarged perspective view of a sensing coil and a driving coil disposed on a substrate according to one or more examples.
Figure 3B:
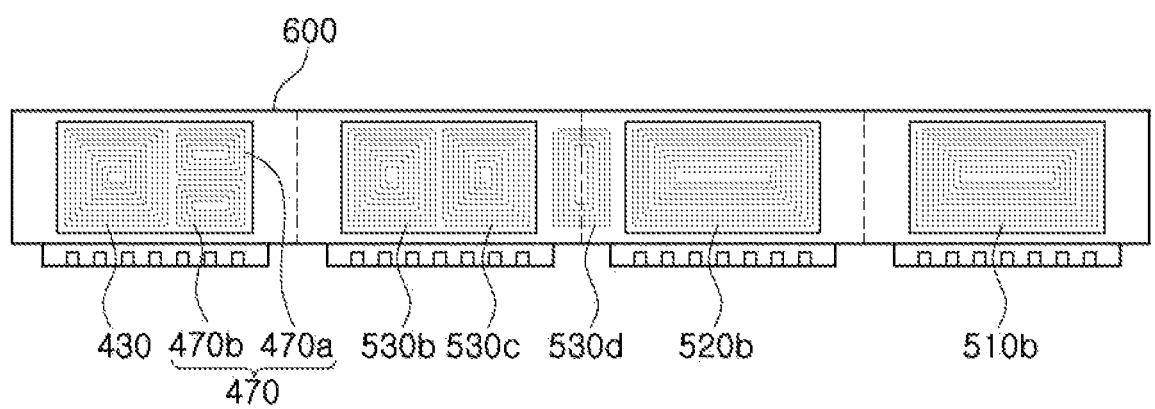
FIGS. 3B and 3C are developed views of sensing coils and driving coils disposed on a substrate according to one or more examples.
Figure 3C:
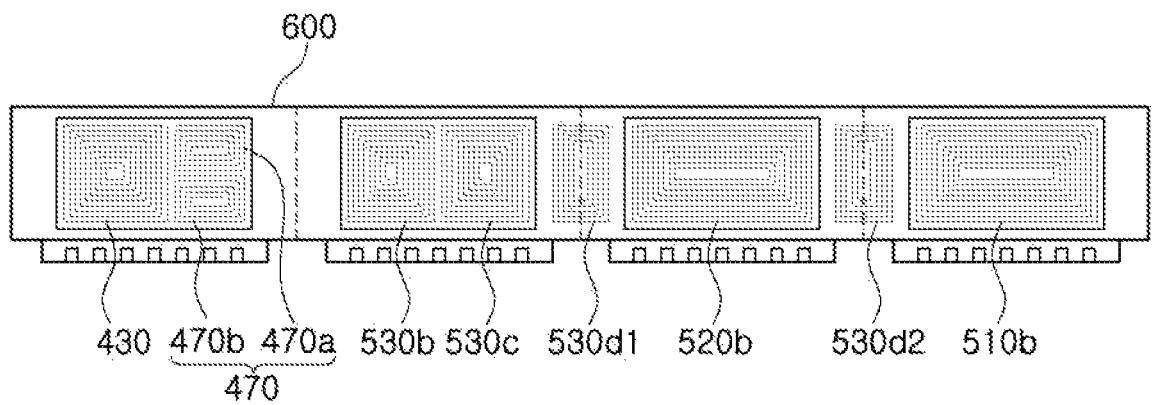
Figure 4A:
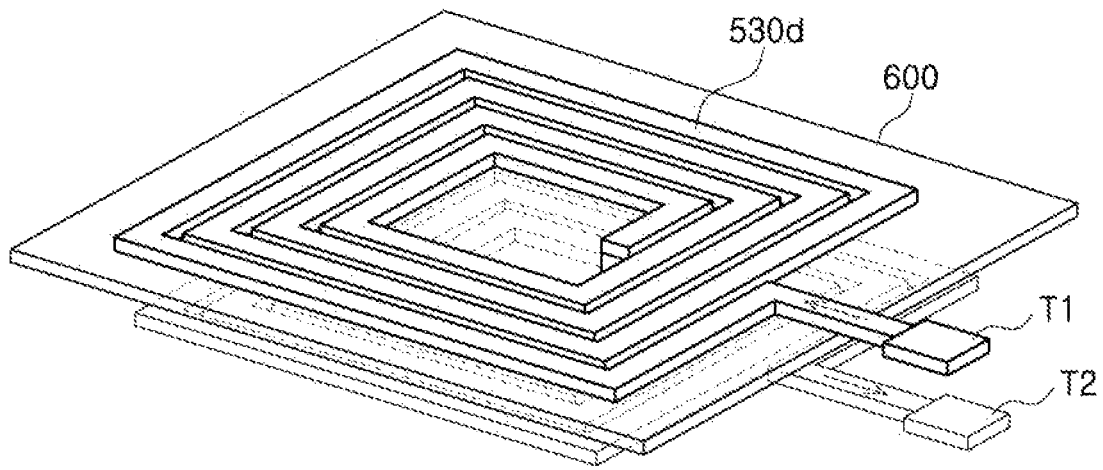
FIGS. 4A, 4B, and 4C illustrate reference coils according to one or more various examples.
Figure 4B:
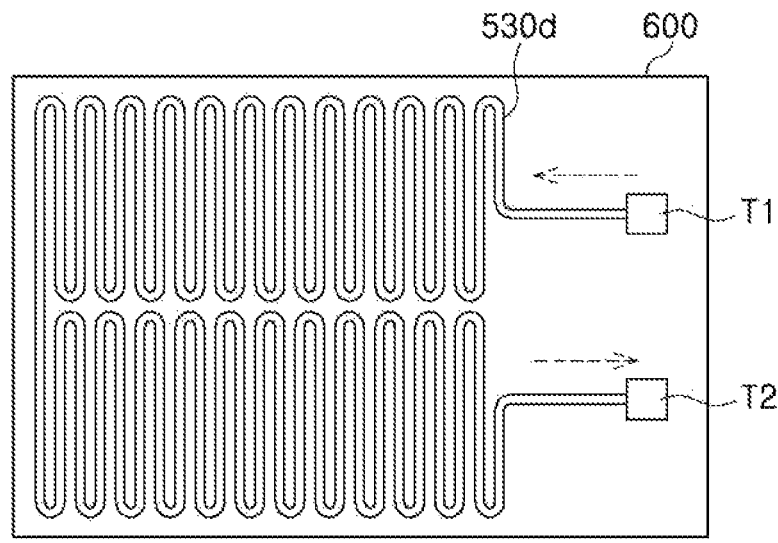
Figure 4C:
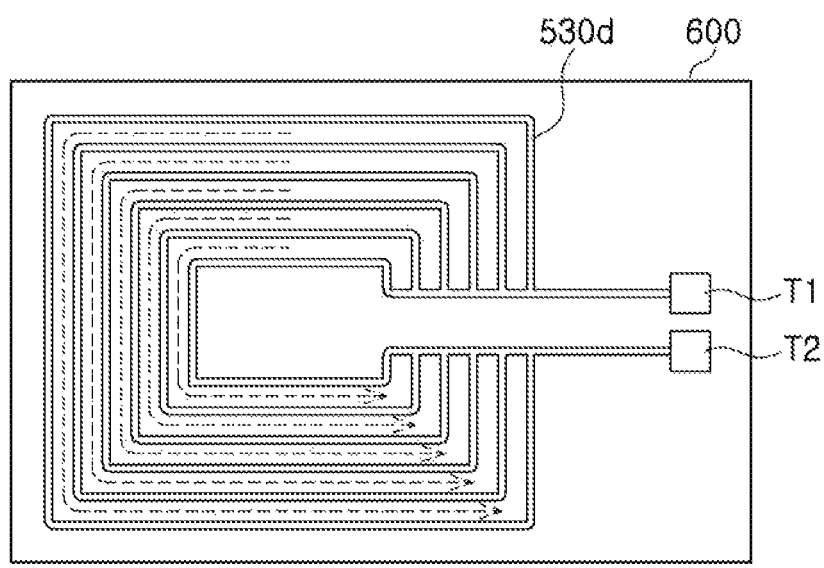

FIG. 1 is a perspective view of a camera module according to one or more examples. FIG. 2 is a schematic exploded perspective view of a camera module according to one or more examples. FIG. 3A is an enlarged perspective view of a sensing coil and a driving coil disposed on a substrate according to one or more examples, and FIGS. 3B and 3C are developed views of a sensing coil and a driving coil disposed on a substrate according to one or more examples. FIGS. 4A, 4B, and 4C illustrate reference coils according to one or more various examples.

A camera module 100 according to one or more examples may include a lens barrel 210, an actuator moving the lens barrel 210, and a case 110 and a housing 120 accommodating the lens barrel 210 and the actuator, and may further include an image sensor module 700 converting light incident through the lens barrel 210 into an electric signal.

The lens barrel 210 may have a hollow cylindrical shape such that a plurality of lenses for capturing an image of a subject may be accommodated therein, and the plurality of lenses may be mounted on the lens barrel 210 along an optical axis. As many of the plurality of lenses as necessary may be disposed according to the design of the lens barrel 210, and each lens may have the same or different optical characteristics, such as a refractive index.

The actuator may move the lens barrel 210. The actuator may adjust a focus by moving the lens barrel 210 in an optical axis (a Z-axis) direction, and may correct shake at the time of capturing an image by moving the lens barrel 210 in a direction perpendicular to the optical axis (the Z-axis). The actuator may include a focus adjustment unit 400 adjusting a focus and a shake correction unit 500 correcting a shake.

Figure 10A:
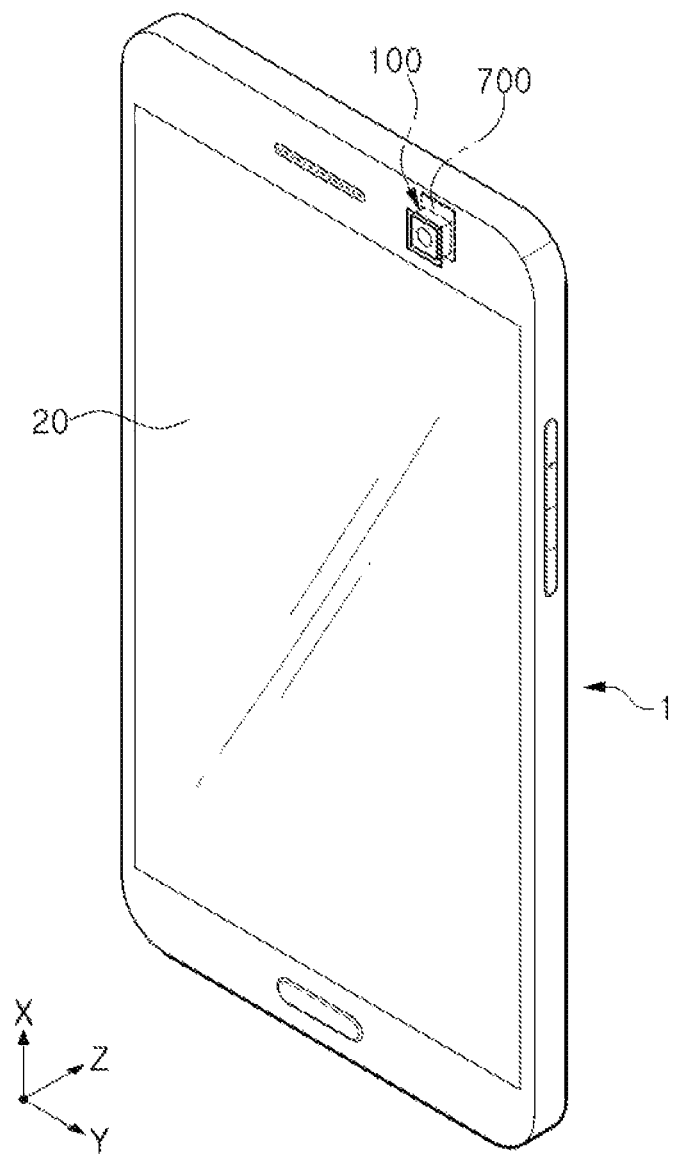
FIG. 10A and FIG. 10B are perspective views illustrating one or more examples of a camera module portable electronic device.
Figure 10B:
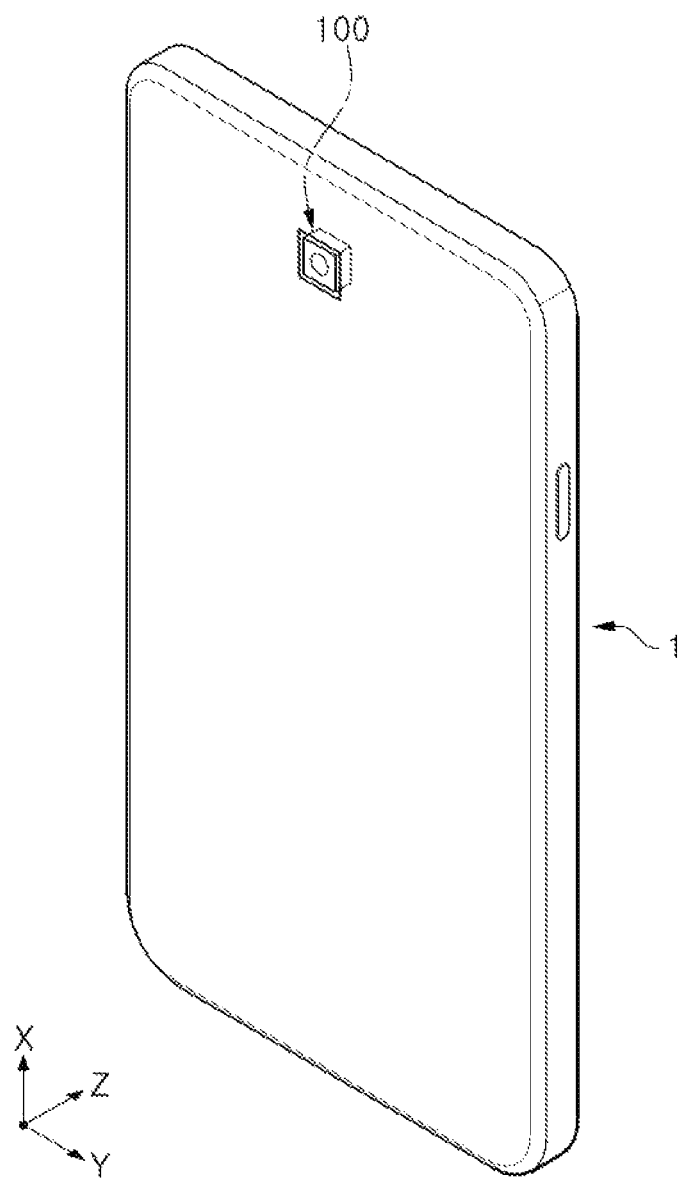

The image sensor module 700 may convert light incident through the lens barrel 210 into an electric signal. The image sensor module 700 may include an image sensor 710 and a printed circuit board 720 connected to the image sensor 710, and may further include an infrared filter. The infrared filter may block light in an infrared region among light incident through the lens barrel 210. The image sensor 710 may convert light incident through the lens barrel 210 into an electric signal. The image sensor 710 may include a charge coupled device (CCD) or a complementary metal-oxide semiconductor (CMOS). The electric signal converted by the image sensor 710 may be output as an image through a display unit 20 of a portable electronic device 1 (FIGS. 10A and 10B). The image sensor 710 may be fixed to the printed circuit board 720, and may be electrically connected to the printed circuit board 720 by wire bonding.

The lens barrel 210 and the actuator may be accommodated in the housing 120. The housing 120 may have a hexahedral shape having open upper and lower portions, and the lens barrel 210 and the actuator may be accommodated in an internal space of the housing 120. The image sensor module 700 may be disposed in a lower portion of the housing 120.

The case 110 may be coupled to the housing 120 to surround an outer surface of the housing 120, and may protect internal components of the camera module 100. Further, the case 110 may shield electromagnetic waves. The case 110 may shield electromagnetic waves such that the electromagnetic waves generated in the camera module do not affect other electronic components in the portable electronic device. In addition, since portable electronic devices may be equipped with various electronic components in addition to the camera module, the case 110 may shield electromagnetic waves such that electromagnetic waves generated from such electronic components do not affect the camera module. The case 110 may be made of a metal material, and may be grounded to a ground pad provided on the printed circuit board 720, thereby shielding the electromagnetic waves.

A stopper 330 may be provided to prevent first to third ball members B2, B3, and B4, a frame 310, and a lens holder 320 from being released outside of a carrier 300 due to an external impact or the like. The stopper 330 may be coupled to the carrier 300 to cover at least a portion of an upper surface of the lens holder 320.

The actuator according to one or more examples may move the lens barrel 210 to focus on a subject. The actuator may include the focus adjustment unit 400 that moves the lens barrel 210 in the optical axis (the Z-axis) direction.

The focus adjustment unit 400 may include a magnet 410 and a coil 430 generating driving force to move the lens barrel 210 and a carrier 300 accommodating the lens barrel 210 in the optical axis (the Z-axis) direction.

The magnet 410 may be mounted on the carrier 300. The magnet 410 may be mounted on a surface of the carrier 300. A driving coil 430 may be mounted in the housing 120, and may be disposed opposite to the magnet 410. The driving coil 430 may be disposed on a surface of a substrate 600, and the substrate 600 may be mounted in the housing 120.

The magnet 410 may be mounted on the carrier 300, and may move together with the carrier 300 in the optical axis (the Z-axis) direction, and the driving coil 430 may be fixed to the housing 120. Positions of the magnet 410 and the driving coil 430 may be mutually changed.

When the driving signal is applied to the driving coil 430, the carrier 300 may move in the optical axis (the Z-axis) direction by electromagnetic interaction between the magnet 410 and the driving coil 430.

The lens barrel 210 may be accommodated in the carrier 300, and the lens barrel 210 may be also moved in the optical axis (the Z-axis) direction by the movement of the carrier 300. A frame 310 and a lens holder 320 may be also accommodated in the carrier 300 such that the frame 310, the lens holder 320, and the lens barrel 210 may be also moved along the optical axis (the Z-axis) direction, by the movement of the carrier 300.

A rolling member B1 may be disposed between the carrier 300 and the housing 120 to reduce friction between the carrier 300 and the housing 120 when the carrier 300 is moved. The rolling member B1 may be in the form of a ball. The rolling member B1 may be disposed on both sides of the magnet 410.

The present examples use a closed-loop control method sensing and feeding back a position of the lens barrel 210 in the focus adjustment process. Therefore, the focus adjustment unit 400 may include a first position detector for the closed-loop control method. The first position detector 470 may include autofocus (AF) sensing coils 470a and 470b, and the AF sensing coils 470a and 470b may be formed on the substrate 600 along the optical axis (Z-axis) direction, and may be mounted on the housing 120.

Inductances of the AF sensing coils 470a and 470b may change in accordance with the movement of the magnet 410 facing the AF sensing coils 470a and 470b. The first position detector 470 may detect the position of the lens barrel 210 from the change in inductances of the AF sensing coils 470a and 470b in accordance with the movement of the magnet 410 in the optical axis (the Z-axis) direction. According to one or more examples, the focus adjustment unit 400 may further include a first sensing yoke 460 disposed on one side of the magnet 410 to face the AF sensing coils 470a and 470b. The first sensing yoke 460 may be mounted on the carrier 300, and may move along the optical axis (Z-axis) together with the carrier 300. The first sensing yoke 460 may be formed of at least one of a conductor and a magnetic body. When the first sensing yoke 460 is provided, the first position detector 470 may detect a change in the inductances of the AF sensing coils 470a and 470b in accordance with the movement of the first sensing yoke 460 in the direction of the optical axis (the Z-axis). For example, the inductances of the AF sensing coils 470a and 470b may be changed in accordance with displacement of the magnet 410 or the first sensing yoke 460. When the magnet 410 or the first sensing yoke 460 moves in the direction of the optical axis (the Z-axis), area of the magnet 410 or the first sensing yoke 460 overlapping the AF sensing coils 470a and 470b may change. Therefore, the inductances of the AF sensing coils 470a and 470b may change.

The first position detector 470 of the focus adjustment unit 400 may further include one or more capacitor to determine the displacement of the lens barrel 210 from the change in the inductance of the one or more AF sensing coil 470a and 470b. One or more of the capacitors and the AF sensing coils 470a and 470b may form a predetermined AF oscillation circuit. For example, one or more capacitor may be provided corresponding to the number of the AF sensing coils 470a and 470b such that one capacitor and one sensing coil may be configured in the same manner as a predetermined LC oscillator, and may also be configured in the form of a conventional oscillator.

The first position detector 470 of the focus adjustment unit 400 may determine the displacement of the lens barrel 210 from change in frequency of the oscillation signal generated in the AF oscillation circuit. Specifically, when the inductances of the AF sensing coils 470a and 470b forming the AF oscillation circuit is changed, the frequency of the oscillation signal generated in the AF oscillation circuit may be changed. Therefore, the displacement of the lens barrel 210 may be detected, based on the change in frequency of the oscillation signal.

The shake correction unit 500 may be used for correcting blurring of an image or a shaking motion of a moving image due to factors such as user hand-shake or the like during an image shooting operation or a moving image shooting operation. For example, when a shake occurs during a moving image shooting operation due to user hand-shake or the like, the shake correction unit 500 may apply a relative displacement corresponding to the shake to the lens barrel 210 to compensate for the shake. The shake correction unit 500 may move the lens barrel 210 in a direction (X-axis direction or Y-axis direction) perpendicular to the optical axis (the Z-axis) to correct the shake.

The shake correction unit 500 may include a plurality of magnets 510a and 520a and a plurality of coils 510b and 520b generating driving force to move a guide member in a direction perpendicular to the optical axis (the Z-axis). The frame 310 and the lens holder 320 may be inserted into the carrier 300, and may be arranged in the optical axis (the Z-axis) direction to guide movement of the lens barrel 210. The frame 310 and the lens holder 320 may have a space into which the lens barrel 210 may be inserted. The lens barrel 210 may be inserted and fixed in the lens holder 320.

The frame 310 and the lens holder 320 may be moved in a direction perpendicular to the optical axis (the Z-axis) with respect to the carrier 300 by driving force generated by electromagnetic interaction between the magnets 510a and 520a and the coils 510b and 520b, respectively. Among the magnets 510a and 520a and the coils 510b and 520b, the first magnet 510a and the first coil 510b may generate driving force in a first axis (a Y-axis) direction perpendicular to the optical axis (the Z-axis), and the second magnet 520a and the second coil 520b may generate driving force in a second axis (an X-axis) direction perpendicular to the first axis (the Y-axis). The second axis (the X-axis) refers to an axis perpendicular to both the optical axis (the Z-axis) and the first axis (the Y-axis). The magnets 510a and 520a may be arranged to be perpendicular to each other on a plane perpendicular to the optical axis (the Z-axis).

The magnets 510a and 520a may be mounted on the lens holder 320, and the coils 510b and 520b facing the magnets 510a and 520a, respectively, may be arranged on the substrate 600, and may be mounted in the housing 120.

The magnets 510a and 520a may move in a direction perpendicular to the optical axis (the Z-axis) together with the lens holder 320, and the coils 510b and 520b may be fixed to the housing 120. Positions of the magnets 510a and 520a and the coils 510b and 520b may be mutually changed.

The present examples may use a closed loop control method of sensing and feeding back a position of the lens barrel 210 in the shake correction process. Therefore, the shake correction unit 500 may include a second position detector for closed loop control, and may include a second sensing yoke 530a to be detected by the shake correction unit 500. The second position detector may include optical image stabilization (OIS) sensing coils 530b and 530c disposed along the X-axis. The second sensing yoke 530a may be attached to the lens holder 320, and the OIS sensing coils 530b and 530c may be formed on the substrate 600 and mounted on the housing 120. The second sensing yoke 530a and the OIS sensing coils 530b and 530c may face each other on the optical axis (the Z-axis).

Inductances of the OIS sensing coils 530b and 530c may change in accordance with the movement of the second sensing yoke 530a facing the OIS sensing coils 530b and 530c. The second position detector may detect the position of the lens barrel 210 from a change in inductances of the OIS sensing coils 530b and 530c in accordance with the movement in the two directions (the X-axis direction and the Y-axis direction) perpendicular to the optical axis of the second sensing yoke 530a.

When the second sensing yoke 530a moves in the X-axis direction, an area of the second sensing yoke 530a overlapping the OIS sensing coils 530b and 530c may change and the inductances of the OIS sensing coils 530b and 530c may change. When the second sensing yoke 530a moves in the Y-axis direction, a distance between the OIS sensing coils 530b and 530c and the second sensing yoke 530a may change and the inductances of the OIS sensing coils 530b and 530c may change.

The second position detector of the shake correction unit 500 may further include one or more capacitor to determine the displacement of the lens barrel 210 from the change in inductances of the OIS sensing coils 530b and 530c. One or more of the capacitors and the OIS sensing coils 530b and 530c may form a predetermined shake correction oscillation circuit. For example, the one or more capacitor may be provided corresponding to the number of the OIS sensing coils 530b and 530c, such that one capacitor and one sensing coil may be formed in the form of a predetermined second LC oscillator, and may also be configured in the form of a conventional Colpitts oscillator.

The second position detector of the shake correction unit 500 may determine the displacement of the lens barrel 210 from the frequency change of the oscillation signal generated in the shake correction oscillation circuit. Specifically, when the inductances of the OIS sensing coils 530b and 530c forming the shake correction oscillation circuit change, the frequency of the oscillation signal generated in the shake correction oscillation circuit may change. Therefore, the displacement of the lens barrel 210 may be detected, based on the change in frequency of the oscillation signal.

The position detector of the shake correction unit 500 may further include a reference coil 530d provided on one side of the OIS sensing coils 530b and 530c.

The inductance of the reference coil 530d may be maintained to be constant with respect to the movement of the lens barrel 210. In this case, the maintaining inductance constant refers to that the inductance is maintained within a predetermined range.

The reference coil 530d may be disposed in an area outside regions in which the magnet 410, the magnets 510a and 520a, the first sensing yoke 460, and the second sensing yoke 530a face each other, respectively. The reference coil 530d may be disposed in a region which is outside the region in which the magnet 410, the magnets 510a and 520a, the first sensing yoke 460, and the second sensing yoke 530a face each other within the movable range of the lens barrel 210, respectively.

In this case, it can be understood that the movable range of the lens barrel 210 may include all cases, including a neutral position initially set when no driving force is applied to the lens barrel 210, and a certain position when a driving force is applied to the lens barrel 210.

For example, the reference coil 530d may be formed on the substrate 600 to be mounted on a corner region of the housing 120. The reference coil 530d may be disposed outside regions in which the magnet 410, the magnets 510a and 520a, the first sensing yoke 460, and the second sensing yoke 530 face each other, respectively.

The substrate 600 according to one or more examples may be formed of a flexible circuit board. The reference coil 530d may be provided in a region in which the substrate 600 formed of the flexible circuit board is bent and mounted in a corner region of the housing 120.

Referring to FIG. 3B, the reference coil 530d may be disposed in a corner region of the housing 120 between the driving coil 520b and the OIS sensing coil 530c. Further, referring to FIG. 3C, a reference coil 530d1 of two reference coils 530d1 and 530d2 may be mounted in a corner region of the housing 120 between the driving coil 520b and the OIS sensing coil 530c, and another reference coil 530d2 may be mounted in a corner region of the housing 120 between the driving coil 510b and the driving coil 520b.

Since the reference coil 530d may be disposed outside of the region in which the magnet 410, the magnets 510a and 520a, the first sensing yoke 460, and the second sensing yoke 530a face each other, respectively, the inductance of the reference coil 530d may not change.

The second position detector of the shake correction unit 500 may generate an oscillation signal corresponding to the inductance of the reference coil 530d, and may calculate a noise component introduced into the camera module from frequency of the generated oscillation signal. The second position detector of the shake correction unit 500 may remove the noise component from the frequency of the oscillation signal calculated from the OIS sensing coils 530b and 530c, to improve reliability of displacement detection of the lens barrel 210. Although the reference coil 530d is described as one component of the shake correction unit 500 in the above description, the reference coil 530d may also be used in the position detecting operation of the focus adjustment unit 400. Therefore, the reference coil 530d can also be understood as one component of the focus adjustment unit 400.

The driving coil 430, the AF sensing coils 470a and 470b, the driving coils 510b and 520b, and the OIS sensing coils 530b and 530c may be formed of a multilayer coil for securing a sufficient driving force and improving sensing sensitivity. The region in which the driving coil 430, the AF sensing coils 470a and 470b, the driving coils 510b and 520b, and the OIS sensing coils 530b and 530c are provided in the substrate 600 may be formed as a multilayer substrate, and the driving coils 430, the AF sensing coils 470a and 470b, the driving coils 510b and 520b, and the OIS sensing coils 530b and 530c may be implemented as multilayered coils by a circuit pattern provided on a plurality of layers of the multilayer substrate.

Since the reference coil 530d may be used for calculating the noise component introduced into the camera module, the inductance of the reference coil 530d does not need to be excessively large. Therefore, the reference coil 530d may be formed on the monolayer substrate. The reference coil 530d may be formed on one or both surfaces of the monolayer substrate. Since a region in which the reference coil 530d is provided corresponds to a region in which the substrate 600 is bent, the region of the substrate 600 to be bent may be realized as a monolayer, such that the substrate 600 may be more easily bent.

The inductances of the driving coil 430, the AF sensing coils 470a and 470b, the driving coils 510b and 520b, and the OIS sensing coils 530b and 530c formed on the multilayer substrate may each be greater than the inductance of the reference coil 530d formed on the monolayer substrate.

Referring to FIG. 4A, the reference coil 530d may be formed on one surface and another surface of a substrate 600. The reference coil 530d provided on the one surface of the substrate 600 may be connected to a first terminal T1, and the reference coil 530d provided on the other surface of the substrate 600 may be connected to a second terminal T2, to form a signal path from the first terminal T1 to the second terminal T2. The reference coil 530d may be provided on both surfaces of the substrate 600 to ensure inductance required for calculating a noise component.

Referring to FIG. 4B, a reference coil 530d may be formed on one surface of a substrate 600. The reference coil 530d provided on the one surface of the substrate 600 may be connected to a first terminal T1 and a second terminal T2.

A pattern of the reference coil 530*d* formed on the one surface of the substrate 600 may be formed to have a zigzag shape alternatively flowing from a first edge to a central portion, and alternatively flowing from a second edge to a central portion. Therefore, inductance required for calculating a noise component may be secured.

Referring to FIG. 4C, a reference coil 530*d* may be formed on one surface of a substrate 600. The reference coil 530*d* provided on the one surface of the substrate 600 may be connected to a first terminal T1 and a second terminal T2. A plurality of signal paths may be formed by a pattern of the reference coil 530*d* formed on the one surface of the substrate 600. In the plurality of signal paths, signal directions may all be the same. Mutual inductance thereof may increase, since the signal directions between the signal paths may be all the same. Therefore, even when the reference coil 530*d* may be formed on the one surface of the substrate 600, to secure inductance required to calculate a noise component.

Referring to FIG. 2, the camera module 100 may include a plurality of ball members supporting the shake correction unit 500. The plurality of ball members may serve to guide movement of the frame 310, the lens holder 320, and the lens barrel 210 in the shake correction process. The plurality of ball members may also function to maintain a gap between the carrier 300, the frame 310, and the lens holder 320.

The plurality of ball members may include a first ball member B2 and a second ball member B3. The first ball member B2 may guide movement of the frame 310, the lens holder 320, and the lens barrel 210 in the first axis (the Y-axis) direction, and the second ball member B3 may guide movement of the lens holder 320 and the lens barrel 210 in the second axis (the X-axis) direction.

For example, the first ball member B2 may roll in the first axis (the Y-axis) direction when driving force is generated in the first axis (the Y-axis) direction. Therefore, the first ball member B2 may guide movement of the frame 310, the lens holder 320, and the lens barrel 210 in the first axis (the Y-axis) direction. The second ball member B3 may roll in the second axis (the X-axis) direction when driving force is generated in the second axis (the X-axis) direction. Therefore, the second ball member B3 may guide movement of the lens holder 320 and the lens barrel 210 in the second axis (the X-axis) direction.

The first ball member B2 may include a plurality of ball members arranged between the carrier 300 and the frame 310, and the second ball member B3 may include a plurality of ball members arranged between the frame 310 and the lens holder 320.

A first guide groove portion 301 accommodating the first ball member B2 may be formed on a surface of the carrier 300 on which the carrier 300 and the frame 310 face each other in the optical axis (the Z-axis) direction. The first guide groove portion 301 may include a plurality of guide grooves corresponding to the plurality of ball members of the first ball member B2. The first ball member B2 may be accommodated in the first guide groove portion 301, and may be sandwiched between the carrier 300 and the frame 310. Movement of the first ball member B2 in the optical axis (the Z-axis) direction and the second axis (the X-axis) direction may be restricted in the state of being accommodated in the first guide groove portion 301, and the first ball member B2 may move only in the first axis (the Y-axis) direction. The first ball member B2 may roll only in the first axis (the Y-axis) direction. To this end, a planar shape of each of the plurality of guide grooves in the first guide groove portion 301 may be a rectangular shape having a length in the first axis (the Y-axis) direction.

A second guide groove portion 311 accommodating the second ball member B3 may be formed on a surface of the frame 310 on which the frame 310 and the lens holder 320 face each other in the optical axis (the Z-axis) direction. The second guide groove portion 311 may include a plurality of guide grooves corresponding to the plurality of ball members of the second ball member B3.

The second ball member B3 may be accommodated in the second guide groove portion 311, and may be sandwiched between the frame 310 and the lens holder 320. Movement of the second ball member B3 in the optical axis (the Z-axis) direction and the first axis (the Y-axis) direction may be restricted in the state of being accommodated in the second guide groove portion 311, and the second ball member B3 may move only in the second axis (the X-axis) direction. The second ball member B3 may roll only in the second axis (the X-axis) direction. To this end, a planar shape of each of the plurality of guide grooves in the second guide groove portion 311 may be a rectangular shape having a length in the second axis (the X-axis) direction.

In the present examples, a third ball member B4 supporting movement of the lens holder 320 between the carrier 300 and the lens holder 320 may be provided. The third ball member B4 may guide both the movement of the lens holder 320 in the first axis (the Y-axis) direction and movement in the second axis (the X-axis) direction.

For example, the third ball member B4 may roll in the first axis (the Y-axis) direction when driving force is generated in the first axis (the Y-axis) direction. Therefore, the third ball member B4 may guide movement of the lens holder 320 in the first axis (the Y-axis) direction.

Further, third ball member B4 may roll in the second axis (the X-axis) direction when driving force is generated in the second axis (the X-axis) direction. Therefore, the third ball member B4 may guide movement of the lens holder 320 in the second axis (the X-axis) direction. The second ball member B3 and the third ball member B4 may contact and support the lens holder 320.

A third guide groove portion 302 accommodating the third ball member B4 may be formed on a surface of the carrier 300 on which the carrier 300 and the lens holder 320 face each other in the optical axis (the Z-axis) direction. The third ball member B4 may be accommodated in the third guide groove portion 302, and may be sandwiched between the carrier 300 and the lens holder 320. Movement of the third ball member B4 in the optical axis (the Z-axis) direction may be restricted in the state of being accommodated in the third guide groove portion 302, and the third ball member B4 may roll in the first axis (the Y-axis) direction and the second axis (the X-axis) direction. To this end, a planar shape of the third guide groove portion 302 may have a circular shape. Therefore, the third guide groove portion 302, the first guide groove portion 301, and the second guide groove portion 311 may have different planar shapes.

The first ball member B2 may roll in the first axis (the Y-axis) direction, the second ball member B3 may roll in the second axis (the X-axis) direction, and the third ball member B4 may roll in the first axis (the Y-axis) direction and the second axis (the X-axis) direction.

The frame 310, the lens holder 320, and the lens barrel 210 may move together in the first axis (the Y-axis) direction, when driving force is generated in the first axis (the Y-axis) direction. Here, the first ball member B2 and the third ball member B4 may roll along the first axis (the Y-axis). At this time, movement of the second ball member B3 may be restricted.

Further, the lens holder 320 and the lens barrel 210 may move in the second axis (the X-axis) direction, when driving force is generated in the second axis (the X-axis) direction. The second ball member B3 and the third ball member B4 may roll along the second axis (the X-axis). At this time, movement of the first ball member B2 may be restricted.

Figure 5:
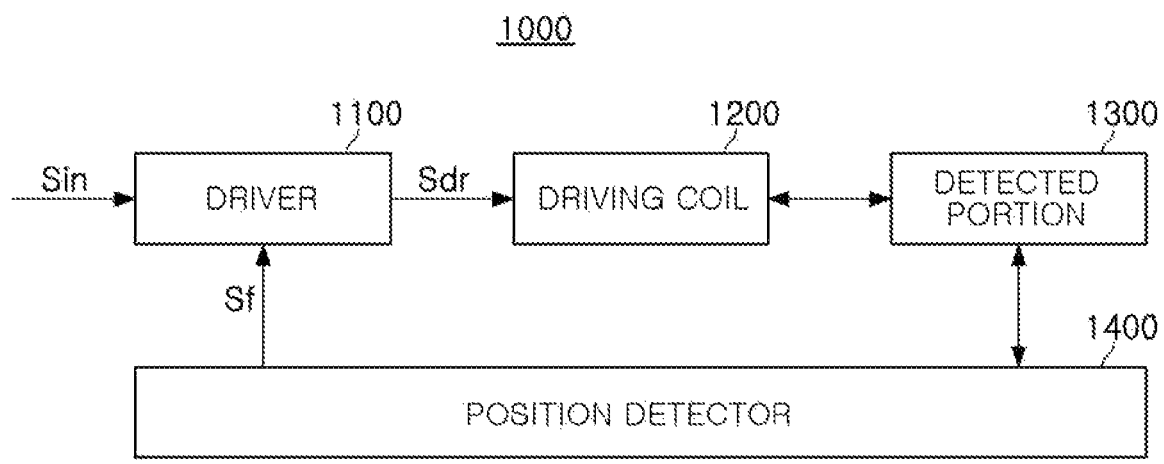
FIG. 5 is a block diagram of a main portion of an actuator employed in a camera module according to one or more examples.

FIG. 5 is a block diagram of a main portion of an actuator employed in a camera module according to one or more examples. An actuator 1000 according to the one or more examples of FIG. 5 may correspond to the focus adjustment unit 400 and the shake correction unit 500 of FIG. 2.

When the actuator 1000 of FIG. 5 corresponds to the focus adjustment unit 400 of FIG. 2, a lens barrel may move in an optical axis direction, to perform an auto focusing (AF) function of a camera module. Therefore, when the actuator 1000 of FIG. 5 performs the auto focusing function, a driver 1100 may apply a driving signal to a driving coil 1200, to provide driving force to the lens barrel in the optical axis direction.

When the actuator 1000 of FIG. 5 corresponds to the shake correction unit 500 of FIG. 2, a lens barrel may move in a direction perpendicular to an optical axis, to perform an optical image stabilization (OIS) function of a camera module. Therefore, when the actuator 1000 of FIG. 5 performs the optical image stabilization function, the driver 1100 may apply a driving signal to a driving coil 1200, to provide driving force to the lens barrel in the direction perpendicular to the optical axis.

An actuator 1000 according to one or more examples may include a driver 1100, a driving coil 1200, a detected portion 1300, and a position detector 1400.

The driver 1100 may generate a driving signal (Sdr) in accordance with an input signal (Sin) applied from the outside and a feedback signal (Sf) generated from the position detector 1400, and may provide the generated driving signal (Sdr) to the driving coil 1200.

When the driving signal (Sdr) provided from the driver 1100 is applied to the driving coil 1200, a lens barrel may move in an optical axis direction and in a direction perpendicular to an optical axis, by an electromagnetic interaction between the driving coil 1200 and a magnet.

The position detector 1400 may detect a position of the lens barrel moving by the electromagnetic interaction between the driving coil 1200 and the magnet through the detected portion 1300, to generate a feedback signal (Sf), and may provide the feedback signal (Sf) to the driver 1100.

The detected portion 1300 may be provided on one side of the lens barrel, to move in the same direction as a moving direction of the lens barrel. The detected portion 1300 provided on one side of the lens barrel may face a sensing coil of the position detector 1400. According to an example, the detected portion 1300 may be provided in a plurality of frames engaging with the lens barrel, in addition to the lens barrel. The detected portion 1300 may be composed of one of a magnetic body and a conductor. For example, the detected portion 1300 may correspond to the magnet 410, the first sensing yoke 460, and the second sensing yoke 530a of FIG. 2.

The position detector 1400 may include a sensing coil, and may detect a position of the detected portion 1300, by converting inductance of the sensing coil changing in accordance with movement of the detected portion 1300, to a frequency. At this time, the sensing coil included in the position detector 1400 may correspond to the sensing coil included in the focus adjustment unit 400 and the shake correction unit 500 of FIG. 2.

Figure 6:
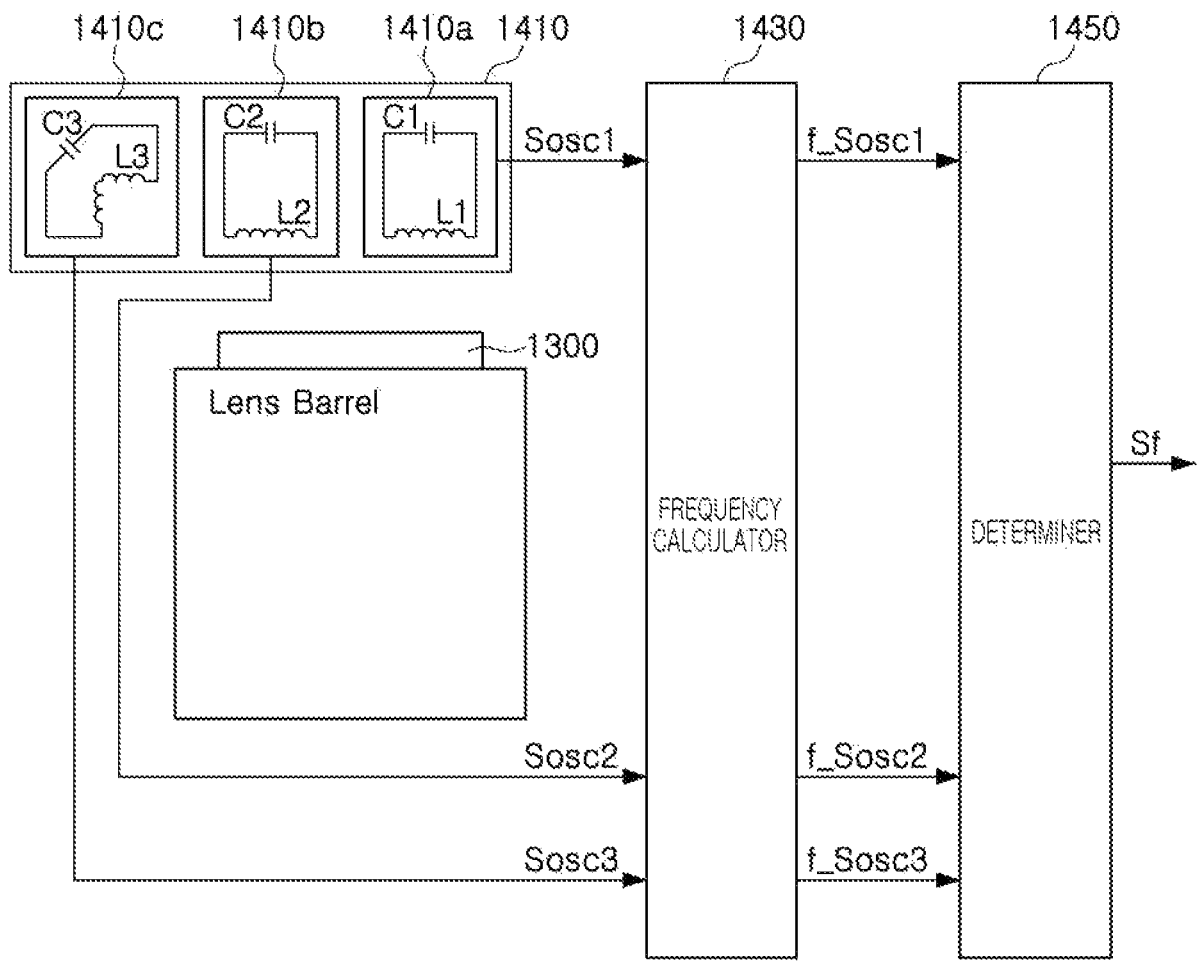
FIG. 6 is a block diagram illustrating a position detector according to one or more examples.

FIG. 6 is a block diagram illustrating a position detector according to one or more examples. Hereinafter, a position detecting operation of a detected portion 1300 by a position detector 1400 will be described with reference to FIGS. 2, 5, and 6.

The position detector 1400 according to one or more examples may detect a position of the detected portion 1300 in accordance with calculation results of inductances of a first sensing coil L1 and a second sensing coil L2, and may remove noise components by applying inductance of a reference coil L3 to calculation results of inductances of the first sensing coil L1 and the second sensing coil L2.

The position detector 1400 may include an oscillator 1410, a frequency calculator 1430, and a determiner 1450.

The oscillator 1410 may include a plurality of oscillation circuits to generate a plurality of oscillation signals (Sosc). The plurality of oscillation circuits may include a first oscillation circuit 1410a, a second oscillation circuit 1410b, and a third oscillation circuit 1410c. The first oscillation circuit 1410a, the second oscillation circuit 1410b, and the third oscillation circuit 1410c may each include a sensing coil and a capacitor, to respectively constitute predetermined LC oscillators. The first oscillation circuit 1410a may include a first sensing coil L1 and a first capacitor C1, the second oscillation circuit 1410b may include a second sensing coil L2 and a second capacitor C2, and the third oscillation circuit 1410c may include a reference coil L3 and a third capacitor C3. In this case, the first sensing coil L1 and the second sensing coil L2 provided in the first oscillation circuit 1410a and the second oscillation circuit 1410b may correspond to the AF sensing coils 470a and 470b included in the focus adjustment unit 400 of FIG. 2, or may correspond to the OIS sensing coils 530b and 530c included in the shake correction unit 500 of FIG. 2. In addition, the reference coil L3 provided in the third oscillation circuit 1410c may correspond to the reference coil 530d of FIG. 2. The first sensing coil L1 and the second sensing coil L2 may detect displacement of the detected portion 1300 facing the first sensing coil L1 and the second sensing coil L2. The first sensing coil L1 and the second sensing coil L2 may detect displacement of the detected portion 1300 in a direction perpendicular to a surface on which the first sensing coil L1 and the second sensing coil L2 are arranged. Since the first sensing coil L1 and the second sensing coil L2 are arranged on the same surface, the inductances of the first sensing coil L1 and the second sensing coil L2 may change in the same direction in accordance with the movement of the detected portion 1300 in the direction perpendicular to the surface on which the first sensing coil L1 and the second sensing coil L2 are arranged. Referring to FIG. 2, when the first sensing coil L1 and the second sensing coil L2 correspond to the one or more of the OIS sensing coils 530b and 530c included in the shake correction unit 500 of FIG. 2, the OIS sensing coils 530b and 530c may detect displacement in the Y-axis direction of the second sensing yoke 530a disposed opposite to the OIS sensing coils 530b and 530c.

The first sensing coil L1 and the second sensing coil L2 may detect the displacement of the detected portion 1300 in a direction in which the first sensing coil L1 and the second sensing coil L2 are arranged. The inductances of the first sensing coil L1 and the second sensing coil L2 may change in different directions from each other, when the detected portion 1300 moves in the direction in which the first sensing coil L1 and the second sensing coil L2 are arranged. Referring to FIG. 2, when the first sensing coil L1 and the second sensing coil L2 correspond to the one or more of the OIS sensing coil 530b and 530c included in the shake correction unit 500 of FIG. 2, the OIS sensing coils 530b and 530c may detect the displacement in the X-axis direction of the second sensing yoke 530a disposed opposite to the OIS sensing coils 530b and 530c. Further, when the first sensing coil L1 and the second sensing coil L2 correspond to the AF sensing coils 470a and 470b included in the focus adjustment unit 400 of FIG. 2, the AF sensing coils 470a and 470b may detect the displacement in the Z-axis direction of the first sensing yoke 460 opposed to the AF sensing coils 470a and 470b.

The first oscillation circuit 1410a, the second oscillation circuit 1410b, and the third oscillation circuit 1410c of FIG. 6 are schematically illustrated. The first oscillation circuit 1410a, the second oscillation circuit 1410b, and the third oscillation circuit 1410c may be configured in various forms of oscillators.

Frequencies of oscillation signals of the first oscillation circuit 1410a, the second oscillation circuit 1410b, and the third oscillation circuit 1410c may be determined by respective inductance of the first sensing coil L1, inductance of the second sensing coil L2, and inductance of the reference coil L3, and corresponding respective capacitance of the first capacitor C1, capacitance of the second capacitor C2, and capacitance of the third capacitor C3. When an oscillation circuit is implemented by an LC oscillator including a sensing coil and a capacitor, frequency (f) of the oscillation signal (Sosc) may be expressed by the following Equation 1. In Equation 1, l denotes inductances of the first sensing coil L1, the second sensing coil L2, and the reference coil L3, and c denotes capacitances of the first capacitor C1, the second capacitor C2, and the third capacitor C3.

$$f = \frac{1}{2\pi\sqrt{lc}}$$ [Equation 1]

When the detected portion 1300 moves together with the lens barrel, since intensity of magnetic field of the detected portion 1300 which influences the inductances of the first sensing coil L1 and the second sensing coil L2 of the oscillator 1410 changes, the inductances of the first sensing coil L1 and the second sensing coil L2 may change. Therefore, frequencies of the first oscillation signal (Sosc1) and the second oscillation signal (Sosc2) output from the first oscillation circuit 1410a and the second oscillation circuit 1410b may change in accordance with the movement of the detected portion 1300. The inductance of the reference coil L3 may be maintained to be constant, even when the detected portion 1300 moves together with the lens barrel. Therefore, frequency of the third oscillation signal (Sosc3) output from the third oscillation circuit 1410c may not change with the movement of the detected portion.

According to one or more examples, magnetic material having a relatively high magnetic permeability may be disposed between the detected portion 1300 and the oscillator 1410, to increase change rate of the inductances of the first sensing coil L1 and the second sensing coil L2 in accordance with the movement of the detected portion 1300.

The first oscillation circuit 1410a and the second oscillation circuit 1410b may generate oscillation signals in the same frequency region band. To this end, the inductance and capacitance of the first oscillation circuit 1410a and the second oscillation circuit 1410b may be the same.

The frequency calculator 1430 may calculate frequency (f_Sosc1) of a first oscillation signal (Sosc1) and frequency (f_Sosc2) of a second oscillation signal (Sosc2), output from the first oscillation circuit 1410a and the second oscillation circuit 1410b, and frequency (f_Sosc3) of a third oscillation signal (Sosc3) output from the third oscillation circuit 1410c. For example, the frequency calculator 1430 may calculate the frequency (f_Sosc1) of the first oscillation signal (Sosc1), the frequency (f_Sosc2) of the second oscillation signal (Sosc2), and the frequency (f_Sosc3) of the third oscillation signal (Sosc3) by using a reference clock CLK. For example, the frequency calculator 1430 may count the first oscillation signal (Sosc1), the second oscillation signal (Sosc2), and the third oscillation signal (Sosc3) by using the reference clock CLK. The reference clock CLK may be a clock signal having an extremely high frequency. For example, when the first oscillation signal (Sosc1), the second oscillation signal (Sosc2), and the third oscillation signal (Sosc3) of one cycle are counted as the reference clock CLK during a reference period, a count value of the reference clock CLK corresponding to the first oscillation signal (Sosc1), the second oscillation signal (Sosc2) and the third oscillation signal (Sosc3) of one cycle may be calculated. The frequency calculator 1430 may calculate the frequency (f_Sosc1) of the first oscillation signal (Sosc1), the frequency (f_Sosc2) of the second oscillation signal (Sosc2), and the frequency (f_Sosc3) of the third oscillation signal (Sosc3) by using the count value of the reference clock CLK and the frequency of the reference clock CLK.

The determiner 1450 may receive the frequency (f_Sosc1) of the first oscillation signal (Sosc1), the frequency (f_Sosc2) of the second oscillation signal (Sosc2), and the frequency (f_Sosc3) of the third oscillation signal (Sosc3) from the frequency calculator 1430, may determine a position of the detected portion 1300 in accordance with calculation results of the frequency (f_Sosc1) of the first oscillation signal (Sosc1) and the frequency (f_Sosc2) of the second oscillation signal (Sosc2), and may apply the frequency (f_Sosc3) of the third oscillation signal (Sosc3) to calculation results of the frequency (f_Sosc1) of the first oscillation signal (Sosc1) and the frequency (f_Sosc2) of the second oscillation signal (Sosc2), to remove noise components.

The determiner 1450 may include a memory, and the memory may store position information of the detected portion 1300 corresponding to the calculation results of the frequency (f_Sosc1) of the first oscillation signal (Sosc1), the frequency (f_Sosc2) of the second oscillation signal (Sosc2), and the frequency (f_Sosc3) of the third oscillation signal (Sosc3). The memory may be implemented as a non-volatile memory including one of a flash memory, an electrically erasable programmable read-only memory (EEPROM), a ferroelectric RAM (FeRAM), and the like.

The determiner 1450 compares the calculation results of the frequency (f_Sosc1) of the first oscillation signal (Sosc1), the frequency (f_Sosc2) of the second oscillation signal (Sosc2), and the frequency (f_Sosc3) of the third oscillation signal (Sosc3), with the position information of the detected portion 1300 previously stored in the memory, to determine a position of the detected portion 1300.

Figure 7:
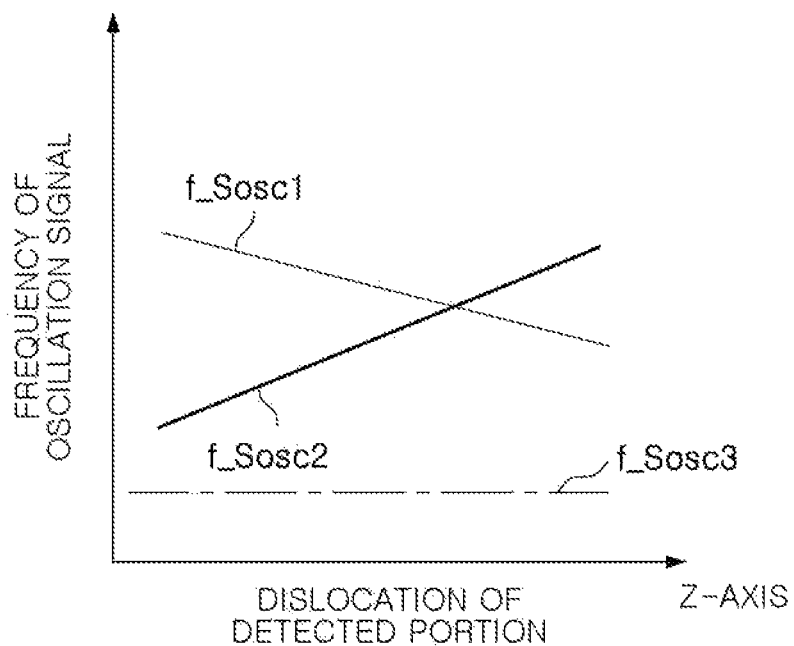
FIG. 7 illustrates frequencies of a plurality of oscillation signals in accordance with movement of a detected portion in a Z-axis direction according to one or more examples.

FIG. 7 illustrates frequencies of a plurality of oscillation signals in accordance with movement of a detected portion in a Z-axis direction according to one or more examples.

In this embodiment, it is assumed that the first sensing coil L1 and the second sensing coil L2 correspond to the AF sensing coils 470a and 470b included in the focus adjustment unit 400 of FIG. 2. When the detected portion 1300 moves in the Z-axis direction, the inductances of the first sensing coil L1 and the second sensing coil L2 may increase or decrease in different directions. Therefore, when the detected portion 1300 moves in the Z-axis direction, change direction of the frequencies of the first oscillation signal (Sosc1) and the second oscillation signal (Sosc2) generated by the first sensing coil L1 and the second sensing coil L2 may be different from each other. The determiner 1450 may determine a position of the detected portion 1300 in the Z-axis direction, based on a difference value between the frequency (f_Sosc1) of the first oscillation signal (Sosc1) and the frequency (f_Sosc2) of the second oscillation signal (Sosc2).

The inductance of the reference coil L3 may be maintained to be constant, even when the detected portion 1300 moves in the Z-axis direction. Therefore, the frequency (f_Sosc3) of the third oscillation signal (Sosc3) generated by the reference coil L3 may be maintained to be substantially constant.

The frequency (f_Sosc1) of the first oscillation signal (Sosc1), the frequency (f_Sosc2) of the second oscillation signal (Sosc2), and the frequency (f_Sosc3) of the third oscillation signal (Sosc3) may change in accordance with the noise components introduced into the camera module. The determiner 1450 may apply the frequency (f_Sosc3) of the third oscillation signal (Sosc3) to the difference value between the frequency (f_Sosc1) of the first oscillation signal (Sosc1) and the frequency (f_Sosc2) of the second oscillation signal (Sosc2), to determine a position of the detected portion 1300 in which the noise component is removed in the Z-axis direction. For example, the determiner 145 may differentiate the frequency (f_Sosc3) of the third oscillation signal (Sosc3) from the difference value between the frequency (f_Sosc1) of the first oscillation signal (Sosc1) and the frequency (f_Sosc2) of the second oscillation signal (Sosc2), to determine a position of the detected portion 1300 in the Z-axis direction.

Figure 8:
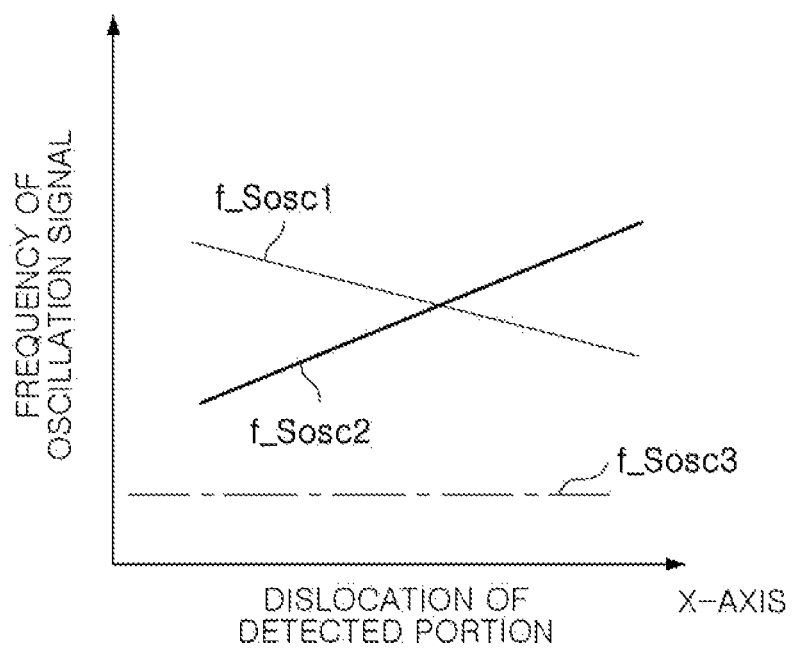
FIG. 8 illustrates frequencies of a plurality of oscillation signals in accordance with movement of a detected portion in an X-axis direction according to one or more examples.

FIG. 8 illustrates frequencies of a plurality of oscillation signals in accordance with movement of a detected portion in an X-axis direction according to one or more examples.

In the present example, it is assumed that the first sensing coil L1 and the second sensing coil L2 correspond to at least one of the OIS sensing coils 530b and 530c included in the shake correction unit 500 of FIG. 2. When the detected portion 1300 moves in the X-axis direction, the inductances of the first sensing coil L1 and the second sensing coil L2 may increase or decrease in different directions. Therefore, when the detected portion 1300 moves in the X-axis direction, change direction of the frequencies of the first oscillation signal (Sosc1) and the second oscillation signal (Sosc2) generated by the first sensing coil L1 and the second sensing coil L2 may be different from each other.

The determiner 1450 may determine a position of the detected portion 1300 in the X-axis direction, based on a difference value between the frequency (f_Sosc1) of the first oscillation signal (Sosc1) and the frequency (f_Sosc2) of the second oscillation signal (Sosc2).

The inductance of the reference coil L3 may be maintained to be constant, even when the detected portion 1300 moves in the X-axis direction. Therefore, the frequency (f_Sosc3) of the third oscillation signal (Sosc3) generated by the reference coil L3 may be maintained to be substantially constant.

The frequency (f_Sosc1) of the first oscillation signal (Sosc1), the frequency (f_Sosc2) of the second oscillation signal (Sosc2), and the frequency (f_Sosc3) of the third oscillation signal (Sosc3) may change in accordance with the noise components introduced into the camera module.

The determiner 1450 may apply the frequency (f_Sosc3) of the third oscillation signal (Sosc3) to the difference value between the frequency (f_Sosc1) of the first oscillation signal (Sosc1) and the frequency (f_Sosc2) of the second oscillation signal (Sosc2), to determine a position of the detected portion 1300 in which the noise component is removed in the X-axis direction. For example, the determiner 1450 may differentiate the frequency (f_Sosc3) of the third oscillation signal (Sosc3) from the difference value between the frequency (f_Sosc1) of the first oscillation signal (Sosc1) and the frequency (f_Sosc2) of the second oscillation signal (Sosc2), to determine a position of the detected portion 1300 in the X-axis direction.

Figure 9:
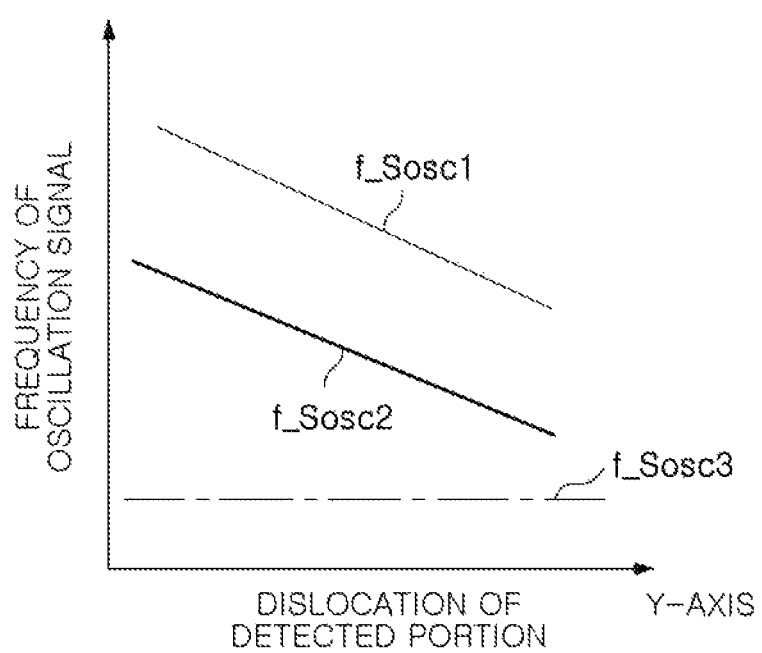
FIG. 9 illustrates frequencies of a plurality of oscillation signals in accordance with movement of a detected portion in a Y-axis direction according to one or more examples.

FIG. 9 illustrates frequencies of a plurality of oscillation signals in accordance with movement of a detected portion in a Y-axis direction according to one or more examples.

In the present example, it is assumed that the first sensing coil L1 and the second sensing coil L2 correspond to the one or more of the OIS sensing coils 530b and 530c included in the shake correction unit 500 of FIG. 2. When the detected portion 1300 moves in the Y-axis direction, the inductances of the first sensing coil L1 and the second sensing coil L2 may increase or decrease in the same direction. Therefore, when the detected portion 1300 moves in the Y-axis direction, change direction of the frequencies f_Sosc1 and f_Sosc2 of the first oscillation signal (Sosc1) and the second oscillation signal (Sosc2) generated by the first sensing coil L1 and the second sensing coil L2 may be the same.

The determiner 1450 may determine a position of the detected portion 1300 in the Y-axis direction, based on the sum of the frequency (f_Sosc1) of the first oscillation signal (Sosc1) and the frequency (f_Sosc2) of the second oscillation signal (Sosc2).

The inductance of the reference coil L3 may be maintained to be constant, even when the detected portion 1300 moves in the Y-axis direction. Therefore, the frequency (f_Sosc3) of the third oscillation signal (Sosc3) generated by the reference coil L3 may be maintained to be substantially constant.

The frequency (f_Sosc1) of the first oscillation signal (Sosc1), the frequency (f_Sosc2) of the second oscillation signal (Sosc2), and the frequency (f_Sosc3) of the third oscillation signal (Sosc3) may change in accordance with the noise components introduced into the camera module.

The determiner 1450 may apply the frequency (f_Sosc3) of the third oscillation signal (Sosc3) to the sum of the frequency (f_Sosc1) of the first oscillation signal (Sosc1) and the frequency (f_Sosc2) of the second oscillation signal (Sosc2), to determine a position of the detected portion 1300 in which the noise component is removed in the Y-axis direction. For example, the determiner 1450 may differentiate the frequency (f_Sosc3) of the third oscillation signal (Sosc3) from the sum of the frequency (f_Sosc1) of the first oscillation signal (Sosc1) and the frequency (f_Sosc2) of the second oscillation signal (Sosc2), to determine a position of the detected portion 1300 in the Y-axis direction.

In the above description, the operation of determining the position of the detected portion 1300, in the case that two of the sensing coils are provided, is described. However, the two or more sensing coils are provided, and the above-described method may be applied to the two or more sensing coils.

Referring to FIGS. 10A and 10B, the camera module 100, according to the examples described herein, may be a mobile device, such as a portable electronic device 1, and further include a display unit 20, wherein the camera module 100 is installed as a front camera of the portable electronic device 1 along with the display unit 20 or as a back camera on a side of the portable electronic device 1 other than a side with the display unit 20. As described in the various examples, an electric signal converted by an image sensor 710 of the camera module 100 may be output as an image via the display unit 20 of the portable electronic device 1.

According to the examples described herein, the portable electronic device, the camera module, and the actuator may precisely detect the position of the lens barrel from the change in the inductance of the sensing coil. Furthermore, since no separate hall sensor is employed, the manufacturing cost of the actuator, the camera module, and the portable electronic device may be reduced and the space efficiency may be improved.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of this disclosure is defined not by the detailed description, but by the claims and their equivalents, and all variations within the scope of the claims and their equivalents are to be construed as being included in this disclosure.

What is claimed is:

1. An actuator of a camera module comprising:
    a detected portion disposed on a lens barrel; and
    a position detector comprising a first sensing coil and a second sensing coil, disposed to face the detected portion, and a reference coil disposed outside of a region facing the detected portion,
    wherein the position detector detects a position of the detected portion in accordance with calculation results of inductances of the first sensing coil and the second sensing coil, and removes noise components by applying inductance of the reference coil to the calculation results of inductances of the first sensing coil and the second sensing coil.

2. The actuator according to claim 1, wherein the first sensing coil and the second sensing coil are formed on a multilayer substrate, and the reference coil is formed on a monolayer substrate.

3. The actuator according to claim 2, wherein the reference coil is formed on one surface or both surfaces of the monolayer substrate.

4. The actuator according to claim 1, wherein inductances of the first sensing coil and the second sensing coil are greater than inductance of the reference coil.

5. The actuator according to claim 4, wherein the inductances of the first sensing coil and the second sensing coil increase or decrease in different directions in accordance with movement of the detected portion.

6. The actuator according to claim 1, wherein the reference coil comprises two or more reference coils disposed outside of the region facing the detected portion.

7. The actuator according to claim 1, wherein the position detector detects displacement of the detected portion in a direction perpendicular to a surface on which the first sensing coil and the second sensing coil are arranged.

8. The actuator according to claim 7, wherein inductances of the first sensing coil and the second sensing coil increase or decrease in the same direction in accordance with movement of the detected portion.

9. The actuator according to claim 1, wherein the position detector detects displacement of the detected portion in an arrangement direction of the first sensing coil and the second sensing coil.

10. A portable electronic device comprising a camera module comprising the actuator according to claim 1 further comprising an image sensor configured to convert light incident through the lens barrel to an electric signal; and
    a display unit disposed on a surface of the portable electronic device to display an image based on the electric signal.

11. A camera module comprising:
    a lens barrel;
    a housing accommodating the lens barrel and comprising a hexahedral shape comprising open upper and lower portions;
    a detected portion disposed on one side of the lens barrel; and
    a position detector comprising a first oscillation circuit comprising a first sensing coil disposed opposite to the detected portion, a second oscillation circuit comprising a second sensing coil disposed opposite to the detected portion, and a third oscillation circuit comprising a reference coil disposed in a corner region of the housing,
    wherein inductance of the reference coil is maintained within a predetermined range with respect to movement of the lens barrel.

12. The camera module according to claim 11, wherein the reference coil is disposed outside of a region facing the detected portion.

13. The camera module according to claim 11, wherein the first sensing coil and the second sensing coil are formed on a multilayer substrate, and the reference coil is formed on a monolayer substrate.

14. The camera module according to claim 13, wherein the reference coil is formed on one surface or both surfaces of the monolayer substrate.

15. The camera module according to claim 11, wherein inductances of the first sensing coil and the second sensing coil are greater than inductance of the reference coil.

16. The camera module according to claim 11, wherein the reference coil comprises two or more reference coils disposed in different corner regions of the housing.

17. The camera module according to claim 11, wherein the position detector differentiates frequency of a third oscillation signal output from the third oscillation circuit from calculation results of frequency of a first oscillation signal output from the first oscillation circuit and frequency of a second oscillation signal output from the second oscillation circuit.

18. The camera module according to claim 11, wherein the camera module is a portable electronic device, further comprising:
    an image sensor configured to convert light incident through the lens barrel to an electric signal; and
    a display unit disposed on a surface of the portable electronic device to display an image based on the electric signal.

19. A portable electronic device, comprising:
- a lens barrel configured to refract light on an image sensor to generate an electric signal;
- a display unit configured to display an image in response to the electric signal;
- a first sensing coil and a second sensing coil, disposed to face a detected portion disposed on the lens barrel, and a reference coil disposed outside of a region facing the detected portion; and
- a position detector configured to determine a position of the detected portion in accordance with calculation results of inductances of the first sensing coil and the second sensing coil, wherein noise components are removed from the calculation results by applying inductance of the reference coil to inductances of the first sensing coil and the second sensing coil.

20. The portable electronic device of claim 19, further comprising a housing accommodating the lens barrel,
- wherein the position detector further comprises a first oscillation circuit comprising the first sensing coil, a second oscillation circuit comprising the second sensing coil, and a third oscillation circuit comprising the reference coil disposed in a corner region of the housing, and
- wherein the calculation results of inductances comprises frequency of a third oscillation signal output from the third oscillation circuit differentiated from calculation results of frequency of a first oscillation signal output from the first oscillation circuit and frequency of a second oscillation signal output from the second oscillation circuit.

* * * * *